G. W. OSBORN.
GRAIN-DRILL.

No. 186,058. Patented Jan. 9, 1877.

WITNESSES:
Chas. Nida
J. H. Scarborough

INVENTOR:
G. W. Osborn
BY
ATTORNEYS.

UNITED STATES PATENT OFFICE.

GEORGE W. OSBORN, OF PARKVILLE, MICHIGAN.

IMPROVEMENT IN GRAIN-DRILLS.

Specification forming part of Letters Patent No. 186,058, dated January 9, 1877; application filed December 11, 1876.

*To all whom it may concern:*

Figure 1:
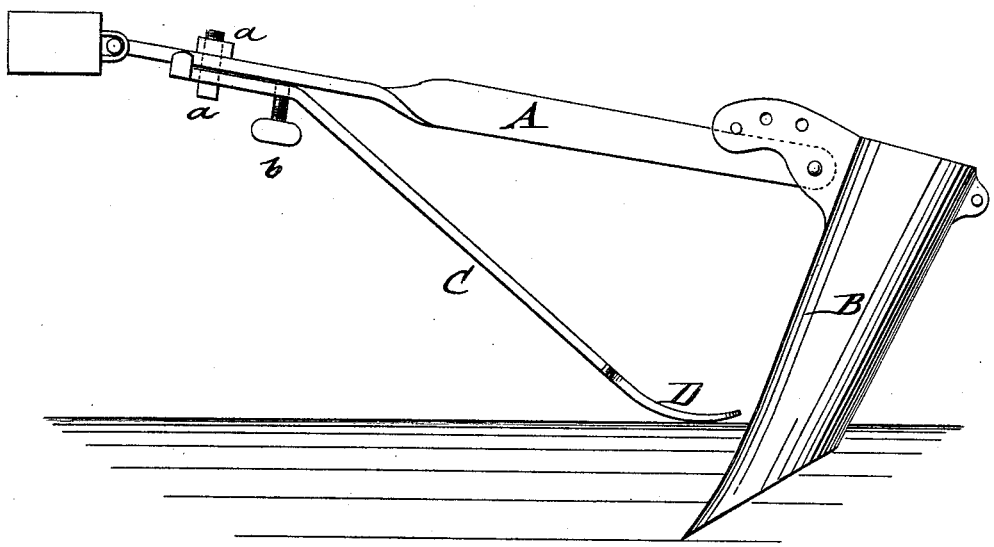
Figure 2:
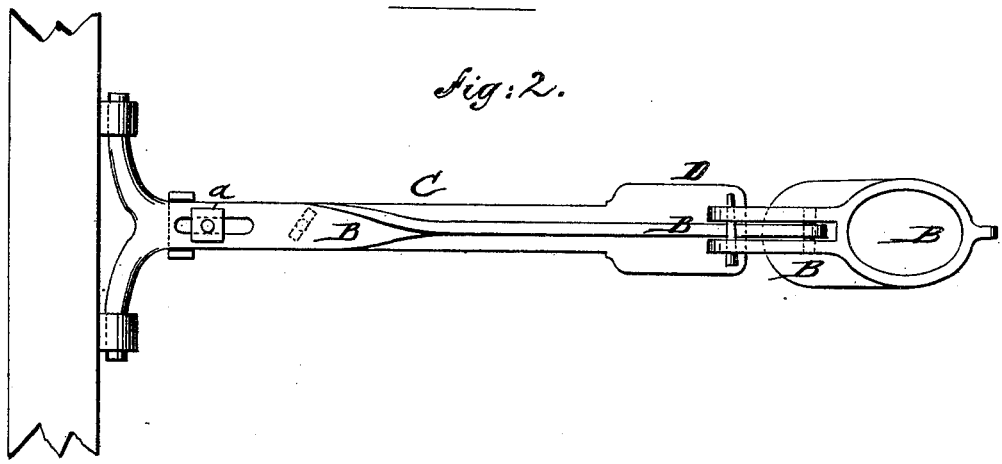

Be it known that I, GEORGE W. OSBORN, of Parkville, in the county of St. Joseph and State of Michigan, have invented a new and Improved Grain-Drill, of which the following is a specification:

In the accompanying drawing, Figure 1 represents a side view, and Fig. 2 a top view, of my improved grain-drill.

Similar letters of reference indicate corresponding parts.

The object of the invention is to provide an improved attachment for seed-drills, for gaging the depth at which the grain shall be deposited in the earth.

The invention consists in an adjustable spring gage-bar attached to the shank of each drill-tooth, as hereinafter described, whereby the teeth may be made to enter the ground a greater or less depth.

In the drawing, A represents the drag-bar, to which the drilling-tooth B is applied in the customary manner. A steel spring bar or gage, C, is attached to the slotted drag-bar by means of a screw-bolt, $a$, and adjusted thereon to greater or less depth by a set-screw, $b$. The gage C is provided with a shoe or foot, D, at the lower end, which runs upon the ground in front of the drill-tooth.

The gage secures the reliable depositing of the grain at the required depth of from one-half to one inch below the ground, being more reliable than the adjusting of the drill-tooth on the drag-bar, as thereby not only the seed is generally deposited at too great a depth, but sometimes, when striking a clod or stone, the tooth will not run in at all, but come out above ground.

By the use of the gage the tooth may be set at a proper inclination or cutting-draft to the drag-bar, which insures the equal depth of planting of the seeds in hard as well as in soft ground. The gage also keeps the drill-teeth clear of any thing that may clog them, and diminishes the draft considerably by the lower and uniform depth at which the teeth are run.

In sowing on sod or stubble ground the grain can also be deposited at the proper depth, as the teeth are not going deep enough to be clogged by anything buried by the plow.

Having thus described my invention, I claim as new and desire to secure by Letters Patent—

The combination, with the slotted draft-bar, of an inclined bar or gage, with shoe or foot at lower end, attached by fastening-bolt and set-screw, substantially as specified.

GEORGE W. OSBORN.

Witnesses:
 DANIEL PFLEEGOR,
 F. ROY OSBORN.